United States Patent
Eberhardt et al.

(10) Patent No.: US 10,844,540 B2
(45) Date of Patent: *Nov. 24, 2020

(54) CLOTHING

(71) Applicant: VOITH PATENT GMBH, Heidenheim (DE)

(72) Inventors: Robert Eberhardt, Ellwangen (DE); Siegfried Graser, Niederstotzingen (DE)

(73) Assignee: Voith Patent GmbH, Heidenheim (DE)

( * ) Notice: Subject to any disclaimer, the term of this patent is extended or adjusted under 35 U.S.C. 154(b) by 158 days.

This patent is subject to a terminal disclaimer.

(21) Appl. No.: 16/093,728

(22) PCT Filed: Apr. 10, 2017

(86) PCT No.: PCT/EP2017/058501
§ 371 (c)(1),
(2) Date: Oct. 15, 2018

(87) PCT Pub. No.: WO2017/178405
PCT Pub. Date: Oct. 19, 2017

(65) Prior Publication Data
US 2019/0136452 A1 May 9, 2019

(30) Foreign Application Priority Data
Apr. 15, 2016 (DE) .................. 10 2016 206 384

(51) Int. Cl.
*D21F 7/08* (2006.01)
*B32B 5/18* (2006.01)
(Continued)

(52) U.S. Cl.
CPC ............... *D21F 7/083* (2013.01); *B32B 5/18* (2013.01); *B32B 5/245* (2013.01); *D03D 1/0094* (2013.01);
(Continued)

(58) Field of Classification Search
CPC . D21F 7/08; D21F 7/083; D21F 7/086; D21F 7/12; D21F 1/0027; D21F 1/0036;
(Continued)

(56) References Cited

U.S. PATENT DOCUMENTS 3,175,025 A * 3/1965 Geen .................. C08J 9/38
264/80
3,617,442 A * 11/1971 Hurschman ........... D21F 1/0063
162/212
(Continued)

FOREIGN PATENT DOCUMENTS

CN 1818208 A 8/2006
DE 68910223 T2 3/1994
(Continued)

*Primary Examiner* — Eric Hug
(74) *Attorney, Agent, or Firm* — Laurence A. Greenberg; Werner H. Stemer; Ralph E. Locher

(57) ABSTRACT

A clothing, in particular a press belt for a machine for producing or processing a fibrous material web, includes a paper side, a backing side, a base fabric and at least one additional structure. The at least one additional structure is formed of or includes a layer of polymer foam which provides the paper side of the clothing. A method for producing a clothing, and a machine for producing a fibrous material web, are also provided.

4 Claims, 2 Drawing Sheets

(51) Int. Cl.
  *B32B 5/24* (2006.01)
  *D21F 1/00* (2006.01)
  *D03D 1/00* (2006.01)
  *D04H 1/485* (2012.01)
  *D04H 1/498* (2012.01)

(52) U.S. Cl.
  CPC ............ *D04H 1/485* (2013.01); *D04H 1/498* (2013.01); *D21F 1/0036* (2013.01); *D03D 2700/02* (2013.01); *D10B 2331/02* (2013.01)

(58) Field of Classification Search
  CPC ......... D21F 1/0063; B32B 5/245; B32B 5/18; B32B 5/26; B32B 5/32
  USPC ..... 162/348, 358.2, 900, 902, 903; 442/221, 442/223, 224, 225, 370, 372, 373
  See application file for complete search history.

(56) References Cited

U.S. PATENT DOCUMENTS

| | | | | |
|---|---|---|---|---|
| 4,271,222 | A * | 6/1981 | Hahn | D21F 1/0063 162/900 |
| 4,369,081 | A * | 1/1983 | Curry | B32B 27/12 156/148 |
| 4,701,368 | A * | 10/1987 | Kiuchi | B32B 27/12 442/226 |
| 4,830,905 | A * | 5/1989 | Gulya | B32B 5/06 442/326 |
| 4,851,281 | A * | 7/1989 | Wood | B32B 5/24 442/225 |
| 4,931,010 | A * | 6/1990 | Barnewall | D21F 7/083 162/900 |
| 5,118,557 | A * | 6/1992 | Barnewall | D21F 7/083 442/223 |
| 5,232,768 | A * | 8/1993 | Eklund | D21F 7/083 139/383 A |
| 7,156,956 | B2 * | 1/2007 | Fitzpatrick | D21F 3/0227 162/358.4 |
| 7,517,434 | B2 | 4/2009 | Ouchi et al. | |
| 7,851,389 | B2 | 12/2010 | Koeckritz | |
| 9,982,388 | B2 * | 5/2018 | Wich | D21F 1/0036 |
| 2006/0175032 | A1 * | 8/2006 | Ouchi | D21F 7/083 162/358.2 |
| 2008/0216980 | A1 * | 9/2008 | Malmqvist | B32B 3/26 162/287 |
| 2009/0286438 | A1 * | 11/2009 | Kockritz | D21G 1/0066 442/62 |
| 2017/0239912 | A1 * | 8/2017 | Eberhardt | B32B 5/18 |

FOREIGN PATENT DOCUMENTS

| | | |
|---|---|---|
| DE | 102006055828 A1 | 5/2008 |
| DE | 102008001854 A1 | 11/2009 |
| EP | 1688536 A1 | 8/2006 |
| EP | 2128334 A1 | 12/2009 |
| WO | 8807929 A1 | 10/1988 |
| WO | 2016058972 A1 | 4/2016 |
| WO | WO 2016/058972 * | 4/2016 ............ D21F 7/083 |

* cited by examiner

CLOTHING

BACKGROUND OF THE INVENTION

Field of the Invention

The present invention relates to a clothing, in particular a press belt for a machine for producing or processing a fibrous material web, including a paper side, a backing side, a base fabric and at least one further structure. The invention also relates to a method for producing a clothing including the steps of providing a base fabric, providing at least one further structure and joining the at least one further structure and the base fabric.

During the production of fibrous material webs, specifically during the production of paper webs, an aqueous fibrous material suspension is normally initially dewatered on a forming fabric or else between two forming fabrics in what is known as a former, after that is further dewatered by pressing between two press felts and ultimately finally dried thermally.

For the dewatering in the press, use is nowadays virtually exclusively made of press felts which comprise a woven base fabric, to which one or more layers of nonwoven fibers are applied. In particular, the side of the press felt that contacts the paper is provided by a fine fiber batt.

For such felts, an extensive prior art is known. By way of example, mention should be made here of the European patent application EP 2 072 668 A1. In the felts described here, the web material contact surface is also provided by a layer of fibrous material.

Nevertheless, although this structure has been used for a long time, it has some disadvantages. Firstly, there is the danger that fibrous structures of the fiber batt that is in contact with the paper can be impressed into the paper surface by the high pressure in the press nip. This can lead to a reduction in the quality of the paper as a result of felt markings. Secondly, it has been known for a long time that, following the dewatering of the paper web in the press nip, what is known as re-wetting of the paper web occurs. Here, water from the fiber batt that contacts the paper gets back to the paper web, which means that the dewatering action of the press is reduced.

SUMMARY OF THE INVENTION

It is therefore an object of the invention to propose a clothing which overcomes or reduces the problems of the prior art.

This object is achieved completely by a clothing, in particular a press belt for a machine for producing or processing a fibrous web, and a method for producing a clothing, as described below.

A clothing, in particular a press belt for a machine for producing or processing a fibrous web, is proposed, the clothing having a paper side and a backing side. The clothing comprises a base fabric and at least one further structure. According to the invention, it is proposed that the at least one further structure consist of or comprise a layer of polymer foam, and that this layer of polymer foam provide the paper side of the clothing.

Such a layer of polymer foam is permeable through its pore structure, so that the water from the paper web can flow through it. However, as opposed to a fiber batt, the surface has no fibers or fiber segments which can be pressed into the paper surface.

Further advantageous embodiments of the press belt according to the invention are described in the sub-claims.

In advantageous embodiments of the invention, the side of the layer of polymer foam that contacts the paper has a lower contact surface with respect to the paper web outside a press nip than conventional staple fiber batt-based press felts. On the other hand, when pressed in a press nip, it is also possible for material components which lie under the uppermost pore layer to become contact points with the paper web. In this way, the contact area with respect to the paper web can be enlarged considerably, and as a result can frequently even become larger than in the case of conventional press felts with a fiber batt contacting the paper.

In addition, provision can advantageously be made for the at least one layer of polymer foam to have an anisotropic pore structure. In such an anisotropic structure, the shape of at least a major part (frequently more than 50% or else more than 80%) of the individual pores differs from the isotropic spherical shape. In this way, in an advantageous embodiment, provision can be made for the pores to exhibit greater expansion in the machine direction of the clothing and in the cross-machine direction of the clothing than in the thickness direction. Such a pore structure can be achieved, for example, by compressing a foam layer with an isotropic pore structure. Frequently, by means of such an anisotropic pore structure, the water can be led quickly away from the paper web in the direction of the base fabric. In addition, as a result the foam layer normally provides a smaller storage volume.

In further advantageous embodiments, provision can be made for the clothing to comprise at least one additional functional structure, which is arranged between the base fabric and the layer of polymer foam or on the side of the base fabric that faces away from the paper. Such an additional functional structure can be, for example, a layer which comprises or consists of nonwoven fibers. However, the additional functional structure can also be other structures, such as a further foam layer, a film, a membrane or the like. In particularly advantageous embodiments, it is entirely possible also for a plurality of additional functional structures to be provided, in particular a plurality of fiber batts.

In further advantageous embodiments, provision can be made for at least one layer of polymer foam to be provided respectively on both sides of the base fabric, that is to say in the direction of the fibrous web and in the direction of the machine.

In other advantageous embodiments, provision can be made for one or more layers of polymer foam to be provided only on one side of the base fabric, specifically in the direction of the paper web.

In a quite particularly preferred embodiment of the invention, provision can be made that, with a compressive loading of the clothing of 3 MPa, the layer of polymer foam is compressed in the thickness direction by more than 30%, preferably by more than 40%, particularly preferably by more than 50%, compared with the initial thickness under a compressive loading of 0.1 MPa.

In particular, provision can also be made that, under a compressive loading of the clothing of 5 MPa or 8 MPa, the layer of polymer foam is compressed in the thickness direction by more than 30%, preferably by more than 40%, particularly preferably by more than 50%.

The thickness measurement of a clothing or the associated layer of polymer foam can be carried out under compressive loading, for example in such a way that a sample is placed under the desired pressure in a computer tomograph or other suitable imaging analysis devices. By using the images obtained in this way, the thickness of the individual components of the clothing can be determined very accurately.

A layer of polymer foam implemented in such a way may be advantageous for the use of the clothing. The range from 3 MPa the 8 MPa constitutes the pressure range which is usually generated in a press nip. If such a clothing is led through a press nip together with a paper web laid thereon—and possibly with a still further clothing—a pressure is exerted on the layer of polymer foam there, by which means this layer is compressed accordingly according to this advantageous embodiment. The indicated 0.1 MPa is intended to represent a typical base load which acts on the clothing even without the action of the press nip, for example caused by the weight of the wet paper web, etc. In a particularly preferred embodiment of the clothing, the layer of polymer foam is formed in such a way that, when the compressive loading of the clothing of 3 MPa (or 5 MPa or 8 MPa) is subsequently relieved to 0.1 MPa, the layer of polymer foam substantially expands again to its initial thickness.

In a particularly advantageous embodiment of the clothing, the combination of compression in a press nip and subsequent expansion after the press nip can lead to the dryness of the material web being increased and the re-wetting described at the beginning being considerably reduced. This effect could surprisingly be observed in trials by the applicant. In this case, as a result of compressing the foam layer in a press nip, the water can be led away more quickly on account of the shortened dewatering path. In addition, as a result of the expansion after the press nip, the pore size and the pore volume of the foam layer are changed. As a result, the water found in the pores and in the base fabric can penetrate back into the material web only with difficulty. These two effects, individually or in combination, can lead to a considerable increase in the dryness of the material web.

In a further advantageous embodiment, the layer of polymer foam can comprise or consist of an elastomer, in particular a polyurethane. Thus, in particular a so-called soft polyurethane foam, and here preferably a reticulated soft polyurethane foam, can be used. However, according to the invention, other materials can be used for the layer of polymer foam, such as a silicone, polyester, polyether, etc.

In preferred embodiments, the layer of polymer foam can have a weight per unit area between 60 g/m$^2$ and 300 g/m$^2$, up to 500 g/m$^2$ or more.

In further preferred embodiments, the layer of polymer foam can have a bulk density between 100 kg/m$^3$ and 700 kg/m$^3$.

The base fabric of the clothing can advantageously comprise or consist of a woven fabric, a laid fabric, or a permeable film structure.

In particular, when a woven fabric is used, a single-layer or multi-layer woven fabric can be used.

Advantageously, the base fabric can have a permeability of more than 250 CFM, in particular more than 500 CFM. In principle, however, base fabrics having a lower permeability can also be used.

Particularly advantageously, the clothing can have a permeability between 10 CFM and 250 CFM, in particular between 25 CFM and 150 CFM.

The base fabric, just like the overall clothing, is advantageously permeable to water and gas. In order to characterize the permeability, however, the determination of the permeability by means of the through flow of air has been established. The unit CFM=cubic foot per minute is a usual unit in the assessment of the permeability of clothings here. In this case, 100 CFM corresponds to around 0.0472 m$^3$/s.

A clothing according to the present invention can be used as a press belt in the press section of a machine for producing a fibrous web—in particular a paper, board, tissue or pulp web. One or more clothings according to the invention can be used in such a press section.

With regard to the method, the object is achieved by a method for producing a clothing, in particular a clothing according to the invention, comprising the steps:

a) providing a base fabric, b) providing at least one further structure, wherein this further structure consists of or comprises a layer of polymer foam, c) joining the at least one further structure and the base fabric in such a way that said further structure provides the side of the clothing that contacts the paper, d) compacting the layer of polymer foam under the influence of pressure and/or temperature.

The method step of compaction permits a large number of properties of the layer of polymer foam to be matched specifically during the production of the clothing to the requirements which are placed on the clothing during use. By way of example and not exhaustively, the following should be mentioned here:

adapting the thickness of the layer of polymer foam;

changing the anisotropy of the pore structure. As a result of the compaction, the extent of at least a major part of the pores in the thickness direction can be reduced. As a result, adaptation of the permeability of the layer of polymer foam can also be achieved.

Furthermore, as a result of the compaction, the compressibility or the compression hardness and/or the elasticity of the layer of polymer foam can be adapted.

Thus, for example, by using commercially obtainable standardized polymer foams, a wide spectrum of specifically adapted clothings can be produced.

A further effect which can be achieved by compaction is a further improvement in the surface characteristics of the side of the clothing that contacts the paper. For example, it is possible, by means of the action of pressure and/or temperature, for the material of the foam layer to be surface-fused. As a result, foam elements or webs that are in contact with one another can be joined integrally to one another. Surfaces produced in this way can exhibit an increased mechanical stability and/or abrasion resistance.

There is also the possibility of using open-pore foams with larger pore diameters, which are then permanently compressed by the compaction. As a result of this compression, cell webs which lay underneath the upper pore layer before the compaction also act as contact points with the paper web. This leads to an enlargement of the contact area with the paper web, in comparison with the non-compacted foam.

The compacted foams usually exhibit a high permeability with little expansion in the thickness direction.

Further advantageous embodiments of the method are described in the sub-claims. The compaction can be carried out, for example, by pressing under elevated temperature with subsequent cooling. Cooling can be carried out whilst maintaining the compaction pressure. To some extent, however, the latter can also be omitted completely, or the cooling can be carried out under a reduced pressure (<90% of the compaction pressure, in particular <75% of the compaction pressure).

Suitable devices for implementing compression can be represented by so-called double-belt presses, which frequently have heating and cooling zones.

Advantageous temperatures for the compaction can differ in the case of different applications and materials. In preferred applications, such as of soft polyurethane foams, the requisite temperatures can lie in the range between 150° C. and 200° C.

In particular if the compaction is carried out following the joining of the foam layer to the base fabric, a further advantageous possible way of compaction consists in having the clothing run through a calender. Here, the calender can have a roll nip wherein at least one roll is heated. Advantageously, the roll which comes into contact with the foam layer is frequently repeated.

In addition, provision can advantageously be made for the method to additionally comprise the step:

b1) providing an additional functional structure and arranging this additional functional structure between the base fabric and the layer of polymer foam or on the side of the base fabric that faces away from the paper.

As already discussed in the description of the clothing, it is also possible for a plurality of additional functional structures to be provided. The additional functional structures can be a fiber batt, a film, a membrane, a further foam layer or the like.

For the joining of the base fabric to the layer of polymer foam and, if appropriate, further functional layers, various methods are possible. For example, the joining can be carried out by needling, adhesive bonding or welding, in particular laser transmission welding, and also a combination of different suitable methods.

The steps for the proposed method do not necessarily have to be carried out in a fixed order. In particular, the compaction of the layer of polymer foam can be carried out before or after the joining of the at least one further structure to the base fabric. In addition, repeated compaction of the layer of polymer foam can be provided. Particularly advantageously, compaction can be performed both before the joining and also after the joining.

Usually, suitable commercially available polymer foams, such as soft polyurethane foams, have thicknesses in the range from 2.5 mm to 9 mm, in particular between 3.5 mm and 7 mm. Such foams can be used as starting material and then compacted further in the method according to the invention.

In particularly preferred embodiments of the method, the thickness of the layer of polymer foam following the compaction is less than 30%, preferably less than 25%, particularly preferably less than 20%, of the initial thickness of the foam layer.

With regard to determining the thickness of the foams, it should be noted that—as opposed to the determination of the compressibility and elasticity of the clothing—this is determined without pressure, that is to say without the application of a base load of 0.1 MPa.

If compaction of the layer of polymer foam is carried out following the fixing to the base fabric, it can occur that parts of the foam layer penetrate or are pressed into depressions in the supporting structure as a result. This proportion will not be used to determine the thickness of the foam layer.

In further advantageous embodiments, the polymer foam can have a pore density between 10 and 80 pores per inch (PPI), preferably between 30 and 60 PPI, before the compaction.

Here, PPI is an internationally usual dimensional unit for the permeability of porous materials and describes a linear structure density.

In further advantageous embodiments, the polymer foam has a bulk density between 15 and 60 kg/m$^3$, preferably between per 25 and 35 kg/m$^3$, before the compaction.

The invention will be described further below by using schematic figures.

DESCRIPTION OF THE INVENTION

Figure 1A:
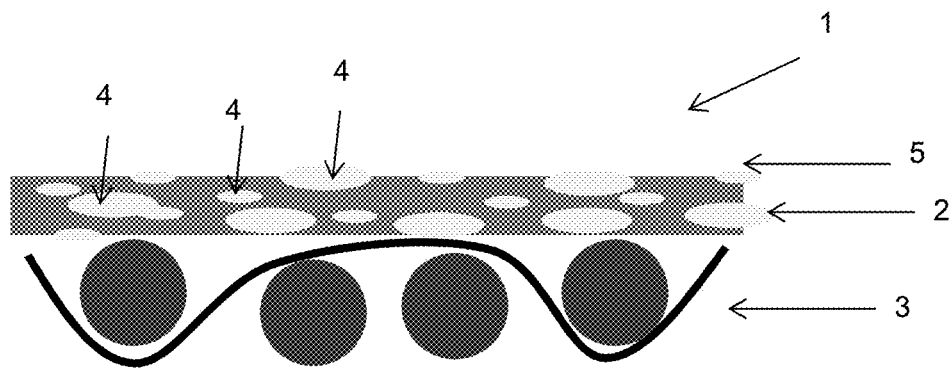
FIGS. 1a, 1b, 1c and 2 show two embodiments of a clothing according to the invention.

In FIG. 1, the structure of a clothing 1, such as can be used as a press belt 1 but also as a forming belt 1, is shown roughly schematically. In the embodiment shown here, the clothing 1 comprises a woven fabric 3, which provides the base fabric 3. A layer of polymer foam 2 is fixed to this base fabric 3. This can, for example, consist of a soft polyurethane foam. This layer of polymer foam 2 also provides the side 5 of the clothing that contacts the paper. The pores 4 of the layer of polymer foam 2 are anisotropic in the clothing shown in FIG. 1. They can be implemented, for example, by a standard polymer foam, which usually has isotropic pores, having been compacted by a compaction step by means of pressure and/or temperature. As a result, in addition to the thickness of the foam layer 2, the shape of the pores 4 also changes. They are deformed in the thickness direction.

By using an example, a possible production method for a clothing as shown in FIG. 1 is to be explained. In the example, first of all a woven base fabric 3 is provided. This can be woven from polyester filaments. In addition, a foam in the form of a reticulated soft polyurethane foam is provided. In the example, this has a thickness of 4 mm and a pore density of 45 PPI. A usual method for joining the layers of polymer foam 2 to the base fabric 3 is represented by laser transmission welding. In the example, an NIR line laser with a wavelength of 940 nm is used. The latter is pressed on with a joining pressure of about 20 N/cm. It is particularly advantageous for the laser transmission welding if the polymer foam 2 absorbs the laser light wholly or partly (the absorption is normally around >70%), while the base fabric 3 is wholly or largely transparent to the laser light. This was implemented in the example by coloring the polymer foam, an anthracite-colored foam being used. As a result of the choice of a base woven fabric made of polyester, the laser light could firstly penetrate the base fabric 3 and after that was absorbed by the polymer foam. Thus, the heat necessary for the welding was generated at the joining point between base fabric 3 and foam layer 2. This is a conventional principle in laser transmission welding.

The laminate joined in this way was then compacted under pressure at a temperature of about 190°.

Figure 1B:
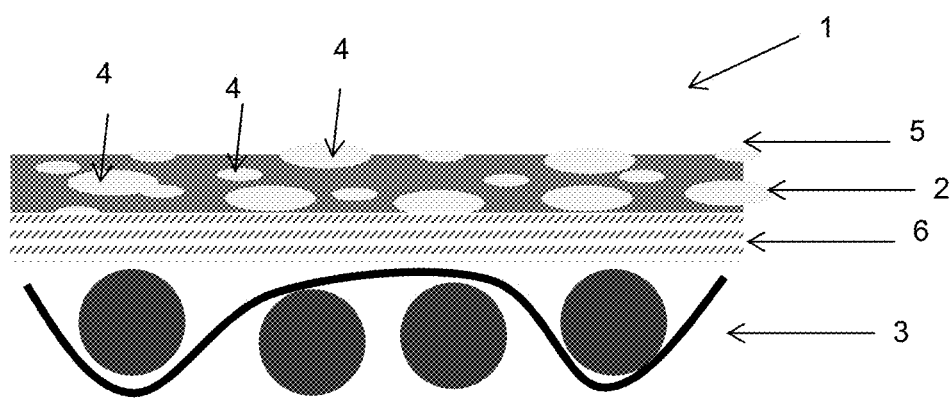
Figure 1C:
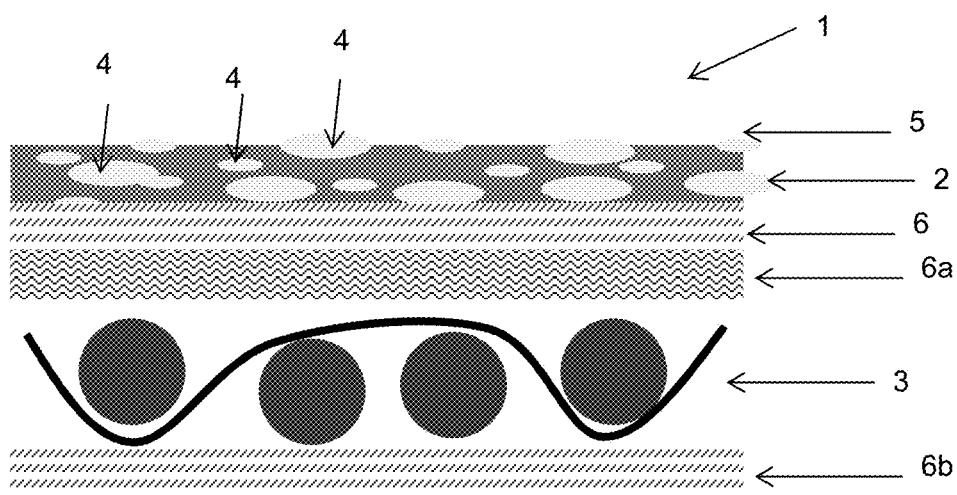

FIGS. 1b and 1c show a clothing according to the invention which, in addition to the components described in FIG. 1a, also have one or more additional functional structures 6, 6a, 6b. These are implemented here as fiber batts but other functional structures, such as films, membranes, foam layers or the like, are also conceivable. The clothing in FIG. 1b has a fiber batt 6, which is arranged between the base fabric 3 and the foam layer 2.

The clothing illustrated in FIG. 1c has three fiber batts 6, 6a, 6b, wherein the individual fiber batts in this example can comprise fibers of different fineness.

For the purposes of further illustration, a possible production of a press belt, as illustrated in FIG. 1c, will be explained in more detail by using the following example 1. The production method described is advantageous but the invention is not restricted to this exemplary method.

In example 1, firstly a press felt having a woven fabric 3 and three layers of fiber nonwoven 6, 6a, 6b was produced from a polyamide material. The fiber batts were joined to the woven fabric 3 by needling. This felt had a weight per unit area of 1100 g/m$^2$ and a permeability of about 62.8 CFM. Also used was an open-pore soft polyurethane (PU) foam. This soft foam, at a weight per unit area of 120 g/m$^2$, had a thickness of 4 mm and a pore density of 30 PPI. The soft PU foam in example 1 was anthracite-colored and absorbent to the radiation of an NIR laser in the region of 940 nm. The joining of the foam layer was carried out by means of NIR laser transmission welding; for this purpose the laser was aimed at the backing side of the belt. The polyamide material of the original felt was virtually transparent to the laser light but was absorbed by the foam layer at the interface to the fiber batt, with the development of heat. The material of at least one of the two layers that were in contact was melted as a result, as a result of which welding of the layers occurred. The welding operation was supported by the fact that a certain joining pressure was also exerted on the sandwich of felt and foam layer. This joining pressure was implemented by the roll optics of the laser, with a line width of 31 mm, pressing with 25N on the felt-foam sandwich, which was supported on a solid surface. The power of the laser in example 1 was 350 W.

After the complete press belt had been welded, the foam layer was compacted further. This compaction was carried out with a line load of 6 kN/m and a temperature of 195° C. These values can be chosen differently, depending on application. A usual temperature range for the compaction lies between 150° C. and 210° C. In addition, the line load can be chosen to be higher or lower.

The press belt obtained in this way from example 1 had a weight per unit area of 1229 g/m$^2$ and a permeability of 63.7 CFM. The pores of the soft foam layer had an anisotropic structure as a result of the compaction. Under a loading of 3 MPa, the foam layer was compressed by more than 30%.

In trials made by the applicant, a surprisingly higher dryness could also be achieved in a paper with the press belt described in example 1 than with comparable felts without a foam layer 2 contacting the paper.

Figure 2:
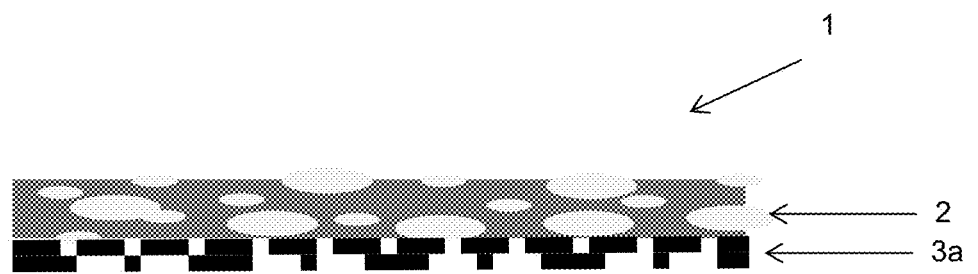

FIG. 2 shows a schematic illustration of a clothing according to the invention, in which the base fabric 3a was provided by a permeable film structure 3a. The film structure 3a here can be a single perforated film. Alternatively, such a film structure can itself be built up from a laminate of different films. The joining of foam layer 2 and base fabric 3a can be carried out, for example, by welding or by adhesive bonding.

The invention claimed is:

1. A clothing or a press belt for a machine for producing or processing a fibrous material web, the clothing comprising:
    a paper side;
    a backing side;
    a base fabric; and
    at least one further structure formed of or including a layer of polymer foam, said layer of polymer foam providing said paper side of the clothing;
    said layer of polymer foam having an anisotropic pore structure;
    said layer of polymer foam being configured to be compressed in a thickness direction by more than 30% under a compressive loading of the clothing of 3 MPa as compared with an initial thickness under a compressive loading of 0.1 MPa; and
    the clothing having a permeability of between 10 CFM and 250 CFM.

2. The clothing according to claim 1, wherein the clothing has a permeability of between 25 CFM and 150 CFM.

3. The clothing according to claim 1, wherein said layer of polymer foam is configured to be compressed in a thickness direction by more than 40% under a compressive loading of the clothing of 3 MPa as compared with an initial thickness under a compressive loading of 0.1 MPa.

4. The clothing according to claim 1, wherein said layer of polymer foam is configured to be compressed in a thickness direction by more than 50% under a compressive loading of the clothing of 3 MPa as compared with an initial thickness under a compressive loading of 0.1 MPa.

* * * * *